United States Patent [19]
Wattenburg

[11] Patent Number: 6,145,992
[45] Date of Patent: Nov. 14, 2000

[54] KEYBOARD ILLUMINATOR AND A METHOD FOR ILLUMINATING A KEYBOARD

[75] Inventor: Willard H. Wattenburg, 535 Oak Ave., Davis, Calif. 95616

[73] Assignee: Willard H. Wattenburg, Walnut Creek, Calif.

[21] Appl. No.: 09/318,176

[22] Filed: May 25, 1999

Related U.S. Application Data

[60] Provisional application No. 60/121,227, Feb. 23, 1999.

[51] Int. Cl.[7] ................................................. F21V 33/00
[52] U.S. Cl. ................................................. 362/85; 362/23
[58] Field of Search ........................ 362/23, 85; 345/170

[56] References Cited

U.S. PATENT DOCUMENTS

| | | | |
|---|---|---|---|
| 5,485,359 | 1/1996 | Galvin | 362/85 X |
| 5,777,704 | 7/1998 | Selker | 349/58 |
| 5,815,225 | 9/1998 | Nelson | 349/665 |
| 5,868,487 | 2/1999 | Polley et al. | 362/33 |

OTHER PUBLICATIONS

Anti–Radiation Hanging Glare Filter for 17 Monitors, Model GRX–17, #2455380, Fry's Advertisement, San Jose Mercury News, Friday, Mar. 5, 1999.

*Primary Examiner*—Stephen Husar
*Attorney, Agent, or Firm*—Flehr Hohabch Test Albritton & Herbert

[57] ABSTRACT

A keyboard illuminator and a method for illuminating a keyboard for use by a computer user operating a computer having a keyboard, a housing and a display that emits light. The keyboard illuminator includes a rigid planar member that is at least partially transmitting and at least partially reflecting and an apparatus for mounting the member on the housing. The member is mounted so that the member is disposed at an angle to the display screen between the display screen and the user such that at least a portion of light emitted by the display screen is reflected onto the keyboard to illuminate the keyboard for operation.

24 Claims, 4 Drawing Sheets

KEYBOARD ILLUMINATOR AND A METHOD FOR ILLUMINATING A KEYBOARD

This appln claims benefit of provisional appn No. 60/121,227 Feb. 23, 1999.

FIELD OF THE INVENTION

The present invention relates generally to computer accessories, and more particularly to a device for illuminating a computer keyboard.

BACKGROUND OF THE INVENTION

There has been a dramatic increase in the use of portable laptop computers. However, the versatility of the portable laptop computer is limited by the amount of ambient light available. When there is an insufficient amount of ambient light a user is unable to see the keyboard and unable to accurately and efficiently operate the computer. Therefore, the places where a user can work on the computer are limited to well lit locations, thus reducing the productivity associated with portable computers. Conventional computers and portable laptop computers are ineffective and inefficient when the user cannot see the keyboard. The need for a user to have full visibility of the keyboard is further amplified by the fact that most laptop computers are designed with smaller keys that are positioned very close together to conserve space thus allowing the laptop to be smaller and more portable.

Apparatus for illuminating computer keyboards have heretofore been provided. For example, separate, low-voltage lights are available for keyboard illumination. When these lights plug into the computer's power source, however, they cause the computer's battery to drain more rapidly. Some portable computers have built in lights to illuminate the keyboard. See for example U.S. Pat. No. 5,815,225 which discloses utilizing the liquid crystal display backlighting light source to illuminate the keyboard by means of light pipes. Such a lighting system is relatively complex and adds to the cost of the computer.

There is, therefore a need for a new and improved apparatus and method for illuminating computer keyboards which overcomes these disadvantages.

In general, it is an object of the present invention to provide an apparatus and method for illuminating a computer keyboard which utilizes light emitted from the display screen of the computer.

Another object of the invention is to provide an apparatus and method for illuminating a computer keyboard of the above character which can be permanently or removably attached to the computer display.

Another object of the invention is to provide an apparatus and method for illuminating a computer keyboard of the above character which is particularly suited for use with a laptop computer.

Additional objects and features of the invention will appear from the following description from which the preferred embodiments are set forth in detail in conjunction with the accompanying drawings.

SUMMARY OF THE INVENTION

A keyboard illuminator and a method are provided for illuminating a keyboard for use by a computer user operating a computer having a keyboard, a housing and a display that emits light. The keyboard illuminator includes a rigid planar member that is at least partially transmitting and at least partially reflecting and an apparatus for mounting the member on the housing. The member is mounted so that the member is disposed at an angle to the display screen between the display screen and the user such that at least a portion of light emitted by the display screen is reflected onto the keyboard to illuminate the keyboard for operation.

DETAILED DESCRIPTION OF THE INVENTION

Figure 1:
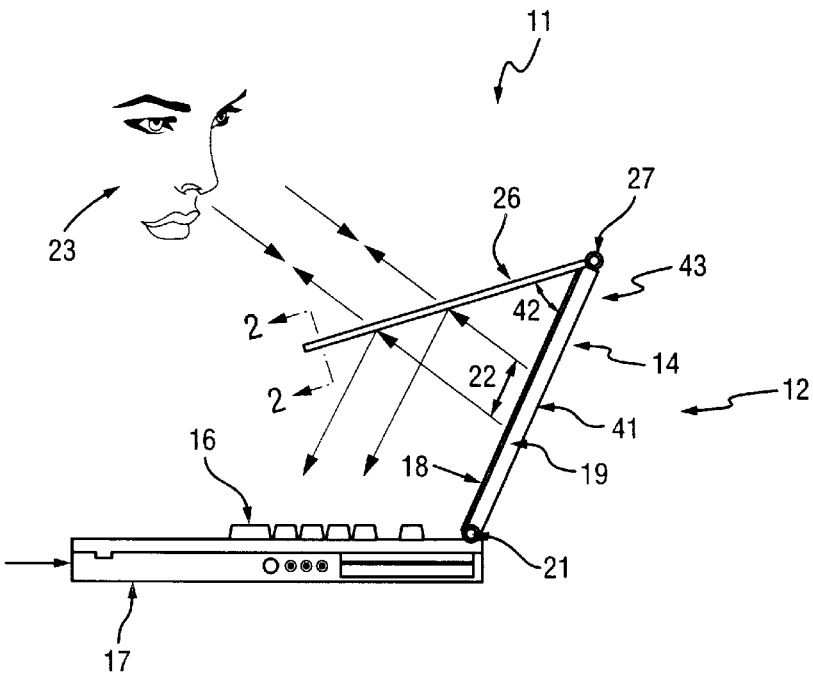
FIG. 1 is a side elevational view of a keyboard illuminator of the present invention mounted on a display screen of a laptop computer in an operational position.

The apparatus and method for illuminating a computer keyboard or keyboard illuminator 11 of the present invention is for use with any suitable computer such as a laptop computer. Laptop computer or computer 12 shown in FIG. 1 includes a base portion 13 and a screen unit 14. Base portion 14 includes a keyboard 16 and a bottom surface 17 which contacts the table or other surface that the computer is rested on. Screen unit 14 includes a display screen 18 and a housing 19, wherein the housing has an outer surface 41. A hinge 21 provides coupling between base portion 13 and screen unit 14 providing pivoting of screen unit 14 relative to base portion 13. When screen unit 14 is not in use it can be pivoted towards and in contact with base portion 13 in a closed position, and when screen unit 14 is in use it can be pivoted way from base portion 13 to an oblique or other angle relative to base portion 13 in an open position. When in operation, light 22 is emitted from display screen 18.

Figure 2:
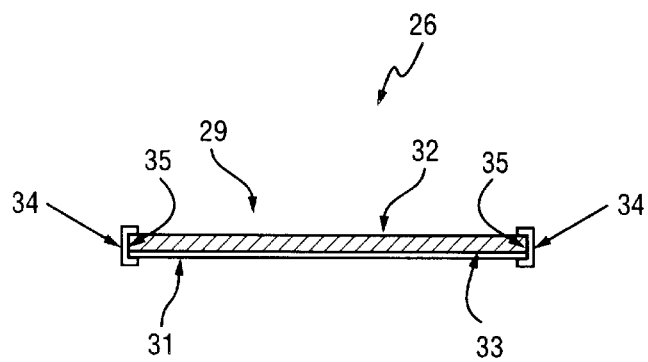
FIG. 2 shows a cross-sectional view taken along the line 2—2 of FIG. 1 of the keyboard illuminator of FIG. 1.

Keyboard illuminator 11 comprises a rigid planar member 26 and means for mounting member or reflective member 26 to housing 19. Reflective member 26 is at least partially reflecting and preferably at least partially transmitting and can include a partially transmitting material or support sheet 29 and a partially reflecting layer 31 as illustrated in FIG. 2. Support sheet 29 can be a rigid sheet of a substantially transparent material such as clear ⅛ inch thick plastic and has a first planar surface 32 and an opposite second planar surface 33. Partially reflecting layer 31 can be made from any suitable material such as LLumor R-20 Silver manufactured by TAP Plastics Inc., of Dublin, Calif. Partially reflecting layer 31 can be adhered or coupled to one of the first and second opposite planar surfaces 32 and 33 of support sheet 29 through any suitable means such as being coated thereon or attached by means of an adhesive. The reflectivity of reflective member 26 can be adjusted by any suitable means such as by selecting the amount or composition of reflecting layer 31 coupled to support sheet 29. A frame 34 can encompass reflective member 26 around the perimeter 35 of reflective member 26.

Figure 3:
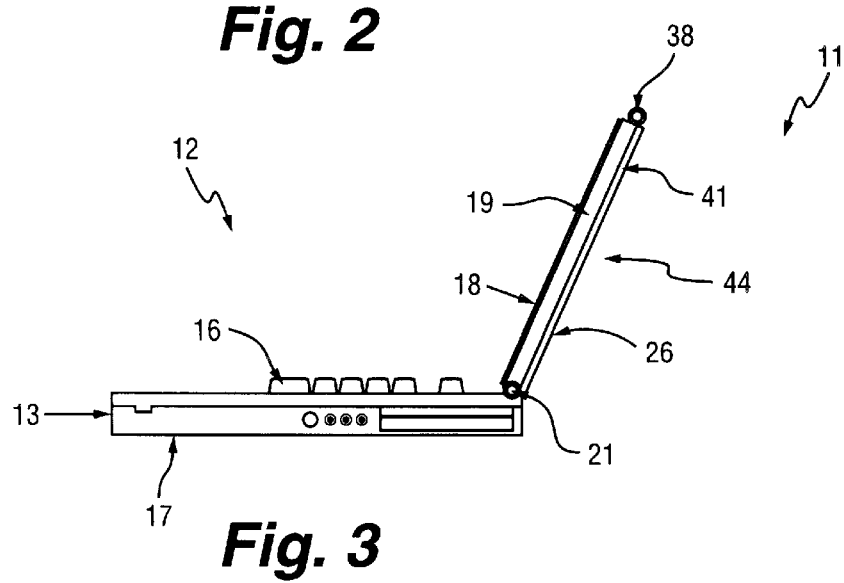
FIG. 3 is a side elevational view of the keyboard illuminator of FIG. 1 in a stored away position.

Means for mounting or mounting mechanism 27 for securing reflective member 26 to computer 12 can include means for pivotally mounting such as at least one hinge assembly or hinge 38 or any other suitable means. In the embodiment of FIGS. 1–3, hinge 38 is permanently mounted to housing 19 and reflective member 26 by any suitable means such as a molded plastic pin and socket assembly so that the reflective member 26 is an integral part of the computer 12. Hinge 38 allows reflective member 26 to be rotatably or pivotally adjusted about hinge 38 to be positioned in either a first or non-operational position 44, as shown in FIG. 3, or a second or operational position 43, as shown in FIG. 1. FIG. 3 shows reflective member 26 rotated about hinge 38 to a non-operational position 44 so that reflective member 26 is positioned back around and flush against an outer surface 41 of housing 19 when keyboard illuminator 11 is not in use. Reflective member 26 can be designed to have similar dimensions as computer 12 so that when in the non-operational position 44 and rotated flush against outer surface 41, reflective member 26 has substantially the same length and width as screen unit 14.

A method of using reflective member 26 includes fixedly or removably mounting reflective member 26 to housing 19 of computer 12, wherein reflective member 26 is partially reflective and preferably partially transparent. Reflective member 26 is positioned between user 23 and display screen 18 so that user 23 views display screen 18 through reflective member 26. Reflective member 26 is further positioned at angle 42 relative to display screen 18 so that at least a portion of light 22 is reflected onto keyboard 16. While simultaneously reflecting a portion of light 22, reflective member 26 transmits a portion of light 22 through reflective member 26 to be viewed by user 23, thus, preferably providing user 23 with an unobstructed view of both display screen 18 and keyboard 16. The referred positioning of reflective member 26 relative to display screen 18 is when angle 42 is at least less than 120°, a more preferred positioning is when angle 42 is between 20° and 70°, a particularly preferred positioning is achieved when angle 42 is approximately 35°.

Display screens are designed to emit sufficient light when viewed in well lit locations. Thus, when viewing the display screen in low or dark ambient light conditions, the display screen will emit much more light than is necessary for effective viewing. Further, when operating the computer in locations where there is little or no ambient light, the user's eyes will adapte to the ambient light level. Accordingly, only a percentage of light 22 emitted from display screen 18 is needed to effectively view display screen 18. Therefore, reflecting a portion of light 22 emitted by display screen 18 to illuminate keyboard 16 will not inhibit the effective viewing of display screen 18. A preferred reflectivity of reflective member 26 is achieved when at least 15% of light 22 emitted from display screen 18 is reflected onto keyboard 16 while still transmitting a sufficient amount of light 22 through reflective member 26 for viewing. A more preferred reflectivity is achieved when reflective member 26 has a reflectivity ranging from approximately 20% to 70%, while a particularly preferred reflectivity is achieved when 30% of light 22 is reflected onto keyboard and surrounding work areas.

The present invention does not require power from the computer, therefore it does not drain the computer battery. Nor does the present invention require a separate power source, thus reducing the cost to purchase, manufacture and operate.

Figure 4:
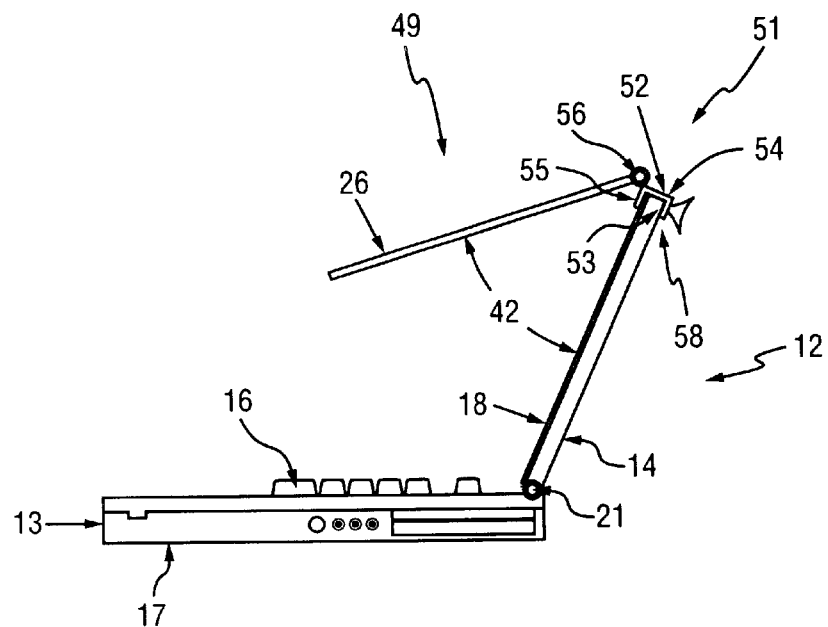
FIG. 4 is a side elevational view of another embodiment of the keyboard illuminator of the present invention mounted on a display screen of a laptop computer.
Figure 5:
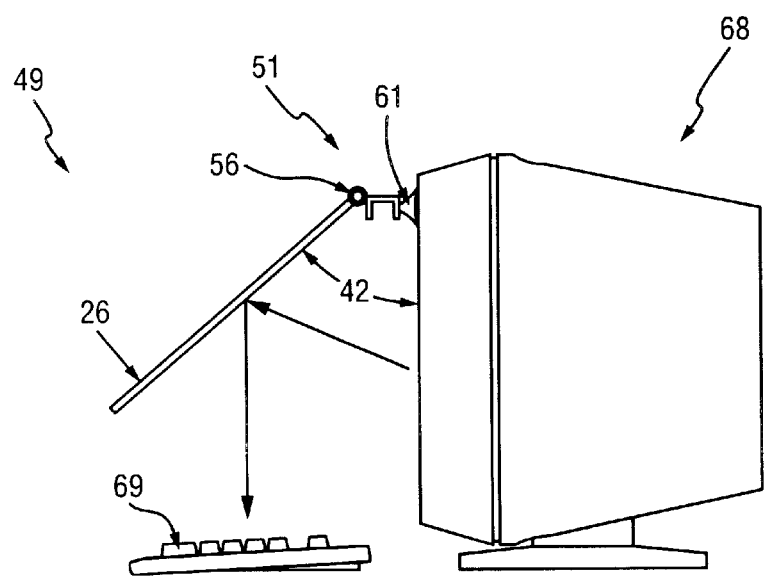
FIG. 5 is a side elevational view of the keyboard illuminator of FIG. 4 mounted on a monitor of a computer.

In another embodiment of the present invention a keyboard illuminator 49 is illustrated in FIGS. 4 and 5 wherein like reference numerals have been used to describe like components of keyboard illuminators 11 and 51. Mounting mechanism 51 thereof includes means for alternatively mounting reflective member 26 to screen unit 14 of laptop computer 12 or to a conventional cathode ray tub monitor 68. Mounting reflective member 26 to monitor 68 allows illumination of a standard computer keyboard 69 which is separate and apart from monitor 68. Alternative mounting means is designed such that the keyboard illuminator 49 can be completely detached from computer 12 when not in use, thus providing a means for removably mounting reflective member 26 to computer 12. Mounting mechanism 51 has a clip assembly 52 for mounting keyboard illuminator 49 to a top portion 58 of screen unit 14, as shown in FIG. 4. Clip assembly 52 includes at least one C-shaped member having an elongated groove formed from of a groove base 54 and spaced-apart side walls 55. Clip assembly 52 can attach to top portion 58 of screen unit 14 by any suitable means, such as a snap-on attachment or clamp with set-screw assembly.

Mounting mechanism 51 further includes a suction-cup assembly 61 for mounting the keyboard illuminator 49 to a computer monitor 68, as shown in FIG. 5. Suction-cup assembly 61 can be coupled to one of side walls 55 of clip assembly 52. Suction-cup assembly 61 allows easy mounting of the keyboard illuminator 49 to substantially any computer monitor 68 as well as to laptop computers. Both assemblies 52 and 61 allow for easy removal when there is sufficient ambient light for the user to view keyboard 16.

The embodiment of the present invention shown in both FIGS. 4 and 5 includes hinge 56, which is comparable to hinge 38, shown in FIGS. 1 and 3, which allows reflective member 26 to be positioned relative to display screen 17. Mounting mechanism 51 is shown as having both clip assembly 52 and suction-cup assembly 61. Alternatively mounting mechanism 51 can be constructed to provide only one of the mounting mechanisms, clip assembly 52 or suction-cup assembly 61.

Figure 6:
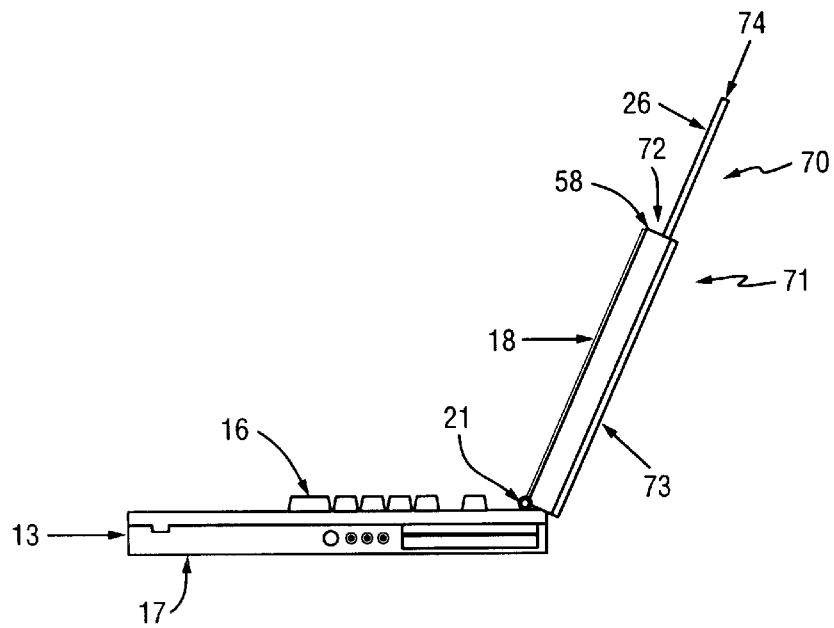
FIG. 6 is a side elevational view of a further embodiment of the keyboard illuminator of the present invention where the reflective member is partially inserted into a storage pocket.
Figure 7:
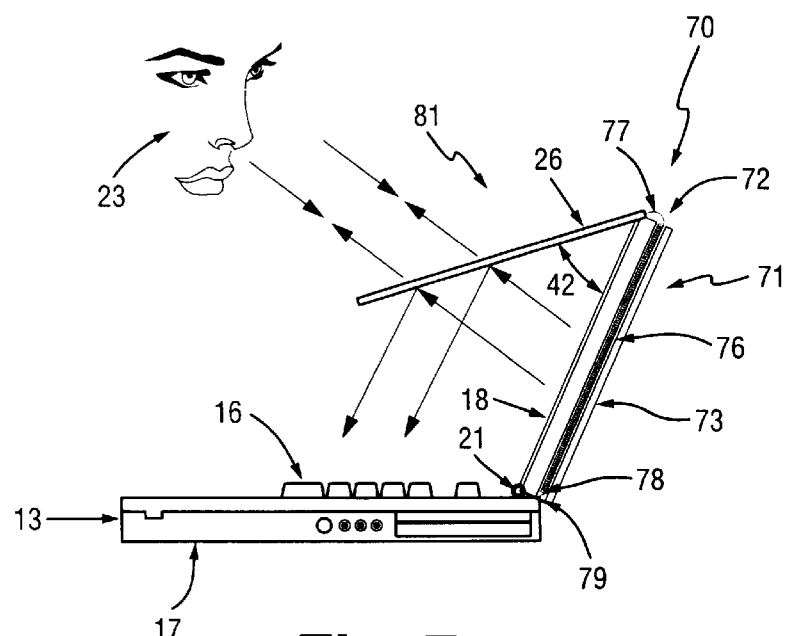
FIGS. 7 and 8 are side elevational views similar to FIG. 6 where the storage pocket has been partially cut away and the reflective member is removed from the storage pocket.

In another embodiment of the present invention a keyboard illuminator 70 is illustrated in FIGS. 6 and 7. Mounting mechanism 71 of keyboard illuminator 70 is an integral part of housing 19 and includes a storage pocket 72 formed from or attached to housing 19. Storage pocket 72 is provided with a recess or cavity into which the keyboard illuminator 70 is stored when not in use. Reflective member 26 is depicted in FIG. 6 as protruding partially out of storage pocket 72, yet the mounting mechanism 71 is designed so that when keyboard illuminator 70 is not in use, reflective member 26 is completely inserted within storage pocket 72 and maintained in a stored-away position (not shown). When reflective member 26 is in the stored-away position a distal end 74 of reflective member 26 can be flush with top portion 58 of screen unit 14. When keyboard illuminator 70 is in use, reflective member 26 is positioned in an operational position 81, as such, reflective member 26 is completely removed from storage pocket 72 and is positioned at angle 42 relative to display screen 18, as shown in FIG. 7. One embodiment for coupling reflective member 26 to storage pocket 72 can be achieved by fixing reflective member 26 to a first end 77 of spring 76 while a second end 78 of spring 76 is fixed within storage pocket 72 at a storage pocket base 79. Spring 76 urges reflective member 26 towards its stored-away position. Spring 76 can further provide a tension force upon reflective member 26 when in operational position 81 to maintain the positioning of reflective member 26 relative to display screen 18 at the desired angle 42.

In another embodiment of mounting mechanism 72 depicted in FIGS. 6 and 7, spring 76 can be replaced with wire or string attached to a tension spool (not shown), wherein the tension spool is mounted within storage pocket 72. The tension spool can provide the needed tension force to maintain reflective member 26 at the desired angle 42. In yet another embodiment, spring 76 can also be attached to a hinge (not shown) similar to hinge 38 depicted in FIG. 3 or a double hinge piece (not shown). The double hinge piece provides positioning of reflective member 26 such that each hinge bends over one of the two top edges of top portion 58 of display unit 14 to maintain reflective member 26 at angle 42.

Another embodiment provides that storage pocket 72 in combination with reflective member 26 are a single unit separate and apart from computer 12. In such an embodiment, the storage pocket and reflective member unit can be fixedly or removably mounted to housing 19. Such an embodiment allows mounting of keyboard illuminator 70, including the pocket which provides protection for reflective member 26 when not in use, to substantially any laptop or computer without redesigning a new housing for computer 12.

Mounting mechanism 27 can also be embodied as pivot pins (not shown) which attach to holes or recesses (not shown) in housing 19. Alternatively, separate pieces can be mounted to housing 19 which contained the holes or recesses for inserting and securing pivot pins. Further, the pivot pins can be attached to reflective member 26 utilizing adjustable stiff swivel joints (not shown) which will allow the positioning of reflective member 26 relative to display screen 18 at angle 42.

It should be appreciated that a variety of means for mounting reflective member 26 to computer 12 can be provided. Further, alternative embodiments of the mounting mechanism include: clips which grasp housing 19; magnet pairs wherein one or more magnets are fixed to reflective member 26 or hinge 38 while an opposite pole magnet for each magnet on reflective member 26 or hinge 38 is fixed to housing 19 thus allowing the magnetic forces to hold reflective member 26 in a fixed position relative to the display screen; support legs which rest on the same surface upon which the base portion 13 rests or alternatively upon the sides of keyboard 16 of computer 12 and thus support reflective member 26.

In addition, it should be appreciated that the support sheet 29 can be constructed from other suitable materials, such as glass. Further, reflective member 26 does not have to be constructed of two separate materials, but rather can be integrally formed from a single partially reflecting and preferably partially transmitting sheet.

Figure 8:
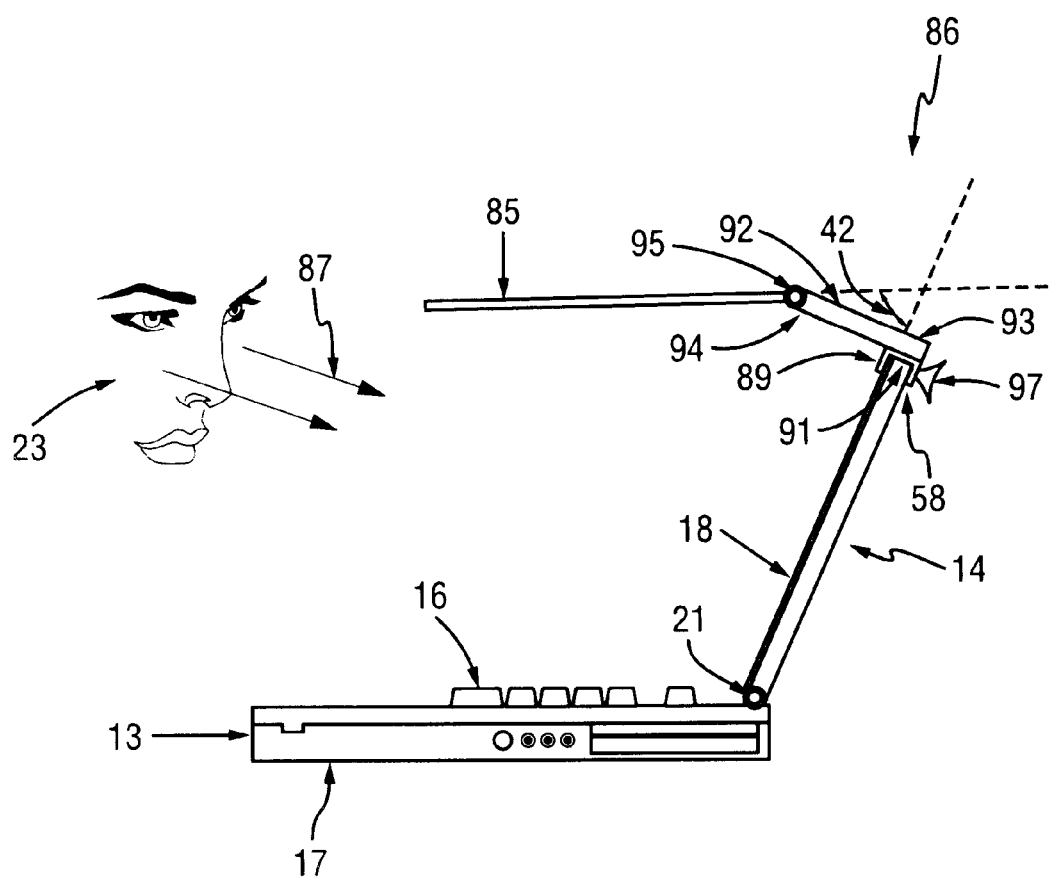

The present invention is not limited to a device that is positioned between user 23 and display screen 18. A keyboard illuminator 86 can be designed such that reflective member 85 is positioned outside the user's view path 87, as depicted in FIG. 8, wherein like reference numerals have been used to describe like components of keyboard illuminators 11, 51 and 86. In this embodiment, the reflective member 85 is positioned above user's view path 87 when viewing display screen 18. In such an embodiment, reflective member 26 is a flat mirror which can reflect some or all of light 22 that is impinging on it back onto keyboard 16. For example, reflective member 85 can have a reflectivity of approximately 100%. Reflective member 26 need not be partially transmitting because display screen 18 is not viewed through reflective member 26. Reflective member 26 includes a mounting mechanism 88 which can be similar to any of the mounting mechanisms discussed avove and as shown is similar to mounting mechanism 51 depicted in FIGS. 4 and 5. Mounting mechanism 88 includes clip assembly 89 which can attach to top portion 58 of screen unit 14 by any suitable means, such as a snap-on attachment or clamp with a set-screw assembly. A first end 93 of an extension arm 92 is coupled to base portion 91 of clip assembly 89 through any suitable means, such as a set-screw assembly or an adhesive. Alternatively, clip assembly 89 and extention arm 92 can be constructed as a single integral component. Extension arm 92 can be constructed of any suitable rigid material, such as metal or plastic. Member 26 is pivotally coupled to second end 94 of extension arm 92 through hinge 95 which allows reflective member 26 to be positioned at angle 42 relative to display screen 18. Mounting mechanism 89 is shown as including suction-cup assembly 97 which is similar to suction-cup assembly 61 depicted in FIGS. 4 and 5 which will allow keyboard illuminator 86 to be mounted to monitor 68 (not shown).

Keyboard illuminator 86 is shown in FIG. 8 to include a flat mirror as reflective member 26. Another embodiment of keyboard illuminator 86 utilizes a concave mirror (not shown) as reflective member 26 which allows further direction of the reflected light onto keyboard 16. Keyboard illuminator 86 can also be constructed without the use of hinge 95. Reflective member 26, whether a flat mirror or concave mirror, is directly coupled to extension arm 92 at a predetermined position.

In another embodiment of the keyboard illuminator of the present invention, reflective member 26 can be a "two-way" mirror.

The foregoing descriptions of specific embodiments of the present invention have been presented for purposes of illustration and description. They are not intended to be exhaustive or to limit the invention to the precise forms disclosed, as many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A keyboard illuminator for use by a computer user operating a computer having a keyboard, a housing and a display screen that emits light comprising a rigid planar member that is at least partially transmitting and at least partially reflecting and means for mounting the member on the housing so that the member is disposed at an angle to the display screen between the display screen and the user such that at least a portion of the light emitted by the display screen is reflected by the member onto the keyboard to illuminate the keyboard for operation.

2. A keyboard illuminator as in claim 1 wherein the means includes means for pivotally mounting the member on the housing to permit selective adjustment of the angle.

3. A keyboard illuminator as in claim 2 wherein the means for pivotally mounting the member includes at least one hinge assembly.

4. A keyboard illuminator as in claim 1 wherein the means includes means for removably mounting the member on the housing.

5. A keyboard illuminator as in claim 4 wherein the means for removably mounting the member includes at least one clip assembly.

6. A keyboard illuminator as in claim 1 wherein the member has a reflectivity of at least 20%.

7. A keyboard illuminator as in claim 6 wherein the member has a reflectivity ranging from approximately 20% to 70%.

8. A keyboard illuminator as in claim 7 wherein the member has a reflectivity of approximately 30%.

9. A keyboard illuminator as in claim 1 for use with a laptop computer wherein the member has a reflectivity sufficient to illuminate the keyboard for use without need for ambient light.

10. A keyboard illuminator as in claim 9 for use with the housing having an outer surface wherein the means includes means for mounting the member to the housing for movement between an operational position in which the member is disposed at an angle to the display screen between the display screen and the user and a non-operational position in which the member is disposed flush with the outer surface of the housing.

11. A keyboard illuminator as in claim 1 wherein the angle is approximately 35°.

12. A keyboard illuminator for use by a user of a computer having a keyboard and a display screen that emits light comprising a rigid planar member that is at least partially reflecting and a mounting mechanism adapted for mounting the member to the computer at a position relative to the display screen so that at least a portion of the light emitted from the display screen is reflected by the member onto the keyboard so as to illuminate the keyboard for operation.

13. The keyboard illuminator of claim 12 wherein the member is partially transmitting and partially reflecting and wherein the mounting mechanism is a mounting mechanism adapted for mounting the member to the computer at a position between the user and the display so that the user views the display through the member.

14. The keyboard illuminator of claim 13 wherein the member includes a rigid sheet of a substantially transparent material.

15. The keyboard illuminator of claim 14 wherein the substantially transparent material has first and second opposite planar surfaces and wherein the member includes a partially reflecting layer adhered to one of the first and second planar surfaces.

16. The keyboard illuminator of claim 15 wherein the partially reflecting layer is LLumor R-20 Silver.

17. The keyboard illuminator of claim 12 for use with a computer having a housing provided with a storage pocket wherein the mounting mechanism mounts the member to the housing for movement between an operational position in which the member is disposed at an angle to the display screen between the display screen and the user and a stored-away position in which the member is positioned within the storage pocket.

18. The keyboard illuminator of claim 17 wherein the mounting mechanism includes a spring for urging the member towards its stored-away position in the storage pocket.

19. A keyboard illuminator as in claim 12 wherein the mounting mechanism is coupled to a first end of an extension arm and the member is coupled to a second end of the extension arm.

20. A keyboard illuminator as in claim 12 wherein the member has a reflectivity of approximately 100%.

21. A keyboard illuminator as in claim 12 wherein the member is a mirror.

22. A keyboard illuminator as in claim 21 wherein the mirror is a concave mirror.

23. A method of illuminating a keyboard of a computer having a housing and a display screen that emits light such that a user of the computer can view the keyboard when there is insufficient ambient light comprising mounting a rigid planar member that is at least partially reflecting and at least partially transmitting to the housing, positioning the member so that the member is disposed at an angle to the display screen between the display screen and the user such that at least a portion of the light emitted by display screen is reflected by the member onto the keyboard illuminating the keyboard for operation and transmitting a portion of the light emitted by the display screen through the member to be viewed by the user.

24. The method of illuminating a keyboard of claim 23 wherein the mounting step includes pivotally mounting the member on the housing to permit selective adjustment of the angle.

* * * * *